US012522782B2

(12) United States Patent
Jackson

(10) Patent No.: US 12,522,782 B2
(45) Date of Patent: Jan. 13, 2026

(54) CONTAINER CANDLE DEVICE WITH SOLID PERMANENT DISPLAY

(71) Applicant: Nimneh Jackson, Moreno Valley, CA (US)

(72) Inventor: Nimneh Jackson, Moreno Valley, CA (US)

( * ) Notice: Subject to any disclaimer, the term of this patent is extended or adjusted under 35 U.S.C. 154(b) by 742 days.

(21) Appl. No.: 17/591,011

(22) Filed: Feb. 2, 2022

(65) Prior Publication Data

US 2023/0242840 A1 Aug. 3, 2023

(51) Int. Cl.

| | |
|---|---|
| ***C11C 5/00*** | (2006.01) |
| ***C11C 5/02*** | (2006.01) |
| ***F21S 19/00*** | (2006.01) |
| ***F21V 35/00*** | (2006.01) |
| *F21Y 113/20* | (2016.01) |
| *F21Y 115/10* | (2016.01) |

(52) U.S. Cl.

CPC ................ *C11C 5/008* (2013.01); *C11C 5/02* (2013.01); *F21S 19/00* (2013.01); *F21V 35/006* (2013.01); *F21Y 2113/20* (2016.08); *F21Y 2115/10* (2016.08)

(58) Field of Classification Search

CPC ............ C11C 5/008; C11C 5/02; F21S 19/00; F21V 35/006; F21Y 2113/20; F21Y 2115/10

USPC .......................................................... 431/291

See application file for complete search history.

(56) References Cited

U.S. PATENT DOCUMENTS

| | | | | |
|---|---|---|---|---|
| 3,806,723 A | | 4/1974 | Wong et al. | |
| 5,395,233 A | * | 3/1995 | Karp | C11C 5/002 431/126 |
| 6,296,477 B1 | * | 10/2001 | Lin | C11C 5/008 431/291 |
| 6,680,014 B2 | * | 1/2004 | Wu | C11C 5/008 431/126 |
| 7,252,423 B1 | * | 8/2007 | Wang | F21S 19/00 362/802 |
| 9,841,160 B2 | | 12/2017 | Magras-Sinnen et al. | |
| 10,859,223 B2 | | 12/2020 | Crawford | |
| 2002/0102507 A1 | * | 8/2002 | Riches | C11C 5/008 431/126 |
| 2002/0150854 A1 | * | 10/2002 | Riches | A61L 9/03 431/291 |
| 2020/0154721 A1 | * | 5/2020 | Piccionelli | F21V 35/003 |

FOREIGN PATENT DOCUMENTS

TW M534801 U * 1/2017

OTHER PUBLICATIONS

TW M534801 U—Translation (Year: 2017).*

* cited by examiner

*Primary Examiner* — Steven B McAllister
*Assistant Examiner* — Benjamin W Johnson

(57) ABSTRACT

A candle device with a solid candle wax and a permanent display is provided. In preferred embodiments the candle device is reusable. In other preferred embodiments the candle device contains an LED device capable of providing LED light to the candle device.

9 Claims, 1 Drawing Sheet

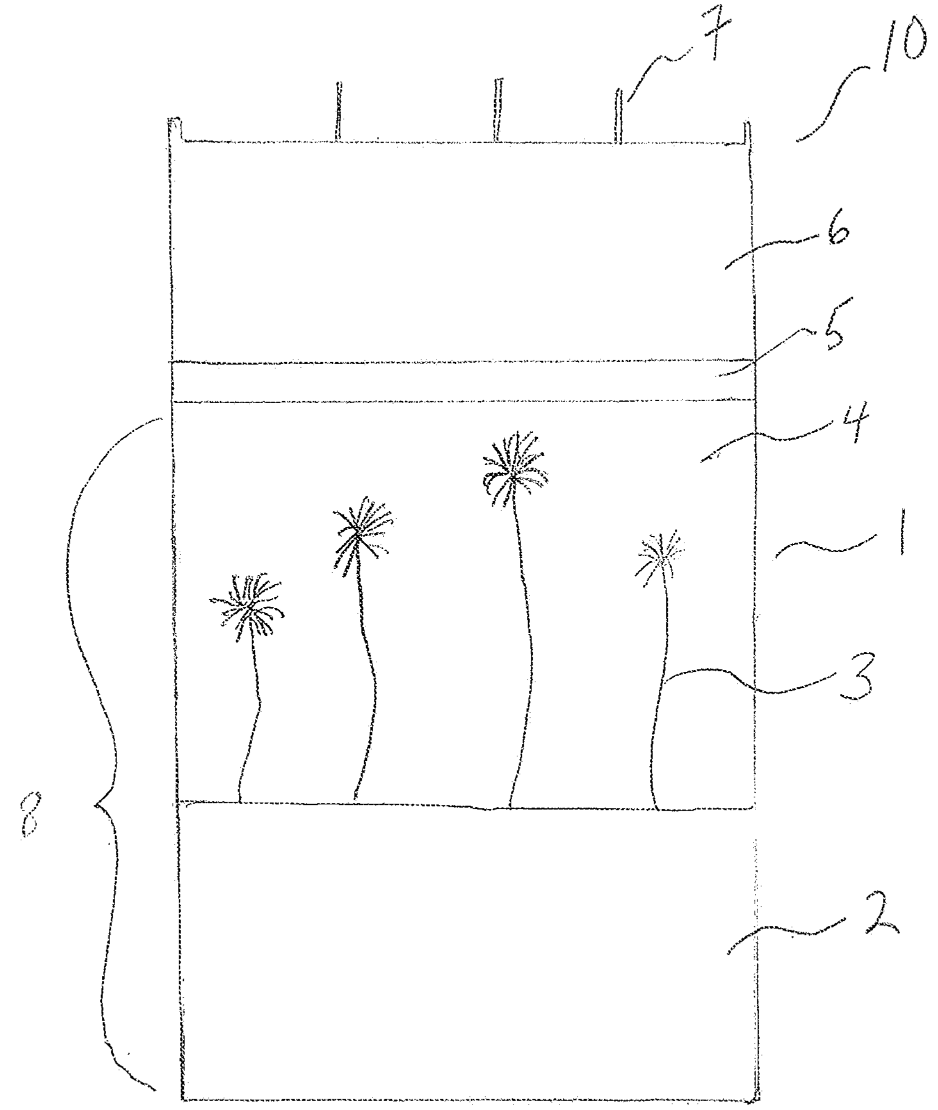
7
10
6
5
4
1
3
8
2

CONTAINER CANDLE DEVICE WITH SOLID PERMANENT DISPLAY

FIELD OF THE INVENTION

The invention relates to a scenic candle device with a permanent display and methods for making such.

BACKGROUND OF THE INVENTION

A candle can provide light and ambiance to a room. New and useful candle devices providing scenes, windows, LED lights and other displays would add to the utility of candle devices. Re-usable candle devices would be especially useful to extend the life and/or the usefulness of the device.

SUMMARY OF THE INVENTION

A new and useful container candle device with a solid permanent display is provided that provides a permanent scene, a window and/or other displays while also providing a candle that provides light and ambiance to a room. Certain preferred embodiments are reusable so that when the candle wax and candle wicks are fully or partially depleted, candle wax and candle wicks can be re-added and/or replenished, extending the useful life of the device as a candle. Certain other preferred embodiments contain one or more LED lights accessible from a computer device (e.g., smartphone app that turns the lights on and off and/or changes the color and intensity of the light emitted) that can add additional light features to the candle device with a permanent display.

The container candle device comprises a glass container comprising at least three layers. A top layer comprises a solid candle wax comprising one or more embedded candle wicks. A second from the top, middle or intervening layer comprises a solid separation base. The third layer from the top comprises a solid permanent display, the solid permanent display comprising a gel wax, embedded display items, and an embedded display base.

Additional layers may be added. In certain preferred embodiments, the candle device has two or more solid permanent displays, each comprising at least a gel wax, embedded display items, and an embedded display base.

The candle device of this invention uses poured candle wax, which is poured into the glass container when hot, and not a cured candle or a floating candle placed in the device. In addition, the permanent display is solid and is not liquid at room temperature.

BRIEF DESCRIPTION OF THE DRAWINGS

FIG. 1 is an exemplary schematic of a candle device with a permanent display of this invention.

DETAILED DESCRIPTION OF THE INVENTION

The invention provides an operational container candle device containing a solid permanent display at its base or lower area. The permanent display can be any desired scene or arrangement, such as a miniature landscape scene, and ocean (i.e., underwater) scene, an oceanscape, on outer space scene (e.g., an outer space galaxy), flower and/or other plant arrangement, figurines (e.g., people, animals), feathers, rocks, layers of things, and/or other objects or groups of objects. In preferred embodiments, the permanent display is pleasing to the eye, of decorative value, and/or of artistic merit.

In certain embodiments, the candle device is capable of being recharged so it can be used as a candle again by pouring new candle wax and adding new candle wicks to replace any that have been used. The user may choose, however, to not re-use the candle part of the device and simply use the permanent display of the device.

In other embodiments, one or more LED lights are placed into the base of the candle device. In more preferred embodiments, the one or more LED lights are controlled wirelessly by a computer device (e.g., a smartphone app) that can control the LED light on/off status, the LED light color, and/or the LED light intensity.

The candle device of this invention contains all solid components at room temperature. Floating candle components are not used. In preferred embodiments, the candle device is stable, with no liquid components, so that it is capable of being used for an extended period of time and minor accidents and any undesired occurrences resulting from using liquid components can be avoided FIG. 1 illustrates an embodiment of this invention, which is a candle device with a permanent display 10. All of the components are solid at room temperature. A glass container 1 is used. A display base 2 has been poured into the glass container 1. A permanent display 8 is created comprising a display base 2 and one or more display objects 3 in cured gel wax 4. A separation base 5 is placed between the permanent display 8 and the candle wax 6. One or more candle wicks 7 are embedded within the candle wax 6.

In other preferred embodiments, additional layers may be added. In certain preferred embodiments, the candle device has two or more solid permanent displays. Each comprising at least a gel wax (similar to FIG. 1 gel wax 4), embedded display objects (similar to FIG. 1 display objects 3), and an embedded display base (similar to FIG. 1 display base 2).

Optionally, and not shown in FIG. 1, an LED device is placed in the permanent display. In certain embodiments, the LED device may be placed in part in the display base. In preferred embodiments, one or more LED lights from the LED device may be arranged within the permanent display.

The subject matter of this disclosure is now described with reference to the following examples. These examples are provided for the purpose of illustration only, and the subject matter is not limited to these examples, but rather encompasses all variations which are evident as a result of the teaching provided herein.

Example 1

Exemplary candle devices with permanent displays, which are embodiments of this invention, are made by the steps described in this example.

The components of these embodiments include, but are not limited to, a glass container, gel wax comprising an embedded display base and optional embedded display objects and/or one or more LED lights, an optional plastic sheet, a solid separation base, and candle wax comprising embedded candle wicks. In certain embodiments, the layers of components that are installed in the glass container, from top to bottom, may comprise:

Candle (e.g., paraffin) wax with embedded candle wick(s);

A solid separation base;

An optional plastic sheet; and

Gel wax with an embedded display base and optional display items and/or one or more LED lights.

Additional layers of some of these components and/or additional components may also be used.

A clean container of clear glass of any size and shape is used. Any fingerprints and debris are removed. A display base (e.g., rock, sand) is then poured and/or otherwise placed into the container. Additional display items (e.g., objects, figurines, dried flowers, glitter, lights, oceanscapes, ocean scenes, outer space scenes (e.g., an outer space galaxy), landscape scenes), if any, are also added to be included with the display base.

Gel wax is then heated (e.g., approximately 210 degrees Fahrenheit) and slowly poured into the container over the display base and any display items to create a permanent scene or other display. Optionally, additional display items and/or one or more LED lights can then be added at this step. The gel wax is permitted to cure. A concave surface of the gel wax often results when it is cooled.

Once the gel wax has cured, a second pour of gel wax is made if necessary to cover any undesirable concave surface that resulted. The second gel wax pour is permitted to cure. A permanent display with a flat top is the result of any such second pour.

There are several gel wax products that can be used. These include gel wax comprised of mineral oil that is gelled with co-polymers. Optionally, color (e.g., liquid dyes) can be added. If bubbles in the permanent display are not desired, care should be taken with the temperature (e.g., maintain higher temperature) of the gel wax when pouring.

After this second gel wax pour an optional step may be added. In this step, a plastic sheet is placed over the last gel wax pour (e.g., over any second gel wax pour if such a pour was necessary) after it is cured. This step is especially useful when using dark colored candle (e.g., paraffin) wax (e.g., black, red, green, blue, etc.) as it may prevent transfer of color between the waxes (e.g., prevent the gel wax absorbing the color used in the candle (e.g., paraffin) wax). If this optional step is practiced, this plastic sheet will be placed between the last gel wax pour (i.e., the plastic sheet will be placed over the last gel wax pour) and the solid separation base (i.e., the plastic sheet will be placed before (i.e., under) the solid separation base).

A solid separation base (e.g., rock, sand, glass insert, metal insert) that may act as a preventative barrier is then placed over the last pour of the gel wax (or over the optional plastic sheet that may have been placed over the last pour of the gel wax) to preserve and/or otherwise maintain the permanent display that was created. This separation base is critical to maintain the permanent display and not have it affected by the burning of the candle. If a separation base is not used, for example, the permanent display and any display items contained therein could burn and emit undesirable odors and have undesirable effects when the candle is burned.

One or more candle wicks are then placed on the separation base.

Candle wax (e.g., paraffin wax, soy wax, gel wax) is then heated (e.g., approximately 110-200 degrees Fahrenheit). Optionally, colored dyes, scent and/or glitter or other objects are added to the candle wax before, after or during the heating process.

The heated candle wax is then poured around the one or more candle wicks and over the separation base and the candle wax is permitted to cure. A concave surface of the candle wax often results when it is cooled.

Once the candle wax has cured, a second pour of candle wax is made if necessary to cover any undesirable concave surface that resulted. The second candle wax pour, if any, is permitted to cure.

The one or more candle wicks are clipped, if necessary, to a useable length. Optionally, scent is added to the top of the candle wax. A final cleaning step of the candle device is performed. An operational candle with a permanent display at its base or lower portion is the result.

The steps of making the most preferred embodiments may comprise the following; (a) inspecting and cleaning any fingerprints or debris off of a glass container; (b) placing a display base into the glass container; (c) placing display items onto and/or into the display base to create a scene; (d) optionally placing an LED device onto and/or into the display base; (e) pouring a first layer of heated gel wax over the display base and display items to create a permanent scene and allowing it to cool; (f) pouring a second layer of gel wax over the first layer if any concave surface resulted on the first layer after it cools; (g) optionally placing a plastic sheet over the gel wax layer or layers; (h) placing a solid separation base over the gel wax layer or layers (i.e., the last gel wax layer) and/or over any optional plastic sheet; (i) placing one or more candle wicks over the solid separation base; (j) pouring a first layer of heated candle wax over the solid separation base and one or more candle wicks and allowing it to cool to form a candle; and (k) pouring a second layer of heated candle wax over the first layer if any concave surface resulted on the first layer after it cools.

If the permanent scene is to have multiple layers, some or all of steps (b) through (h) are repeated for each additional layer of the permanent scene before step (i) is done.

A person of skill in the art will understand that this is one method of making an embodiment of the claimed invention but there are many other ways to achieve the same result.

Example 2

The candle device of Example 1 is used, and the candle wax and candle wick(s) are depleted. One or more candle wicks are placed on the separation base and one or more pours of candle wax are made as described in Example 1, providing a candle device that can be used again as a candle.

Example 3

An LED device (containing one or more LED lights and a battery that is accessible wirelessly) is added to the display base and any display items of Example 1 and gel wax is poured over it. The LED device is accessible (e.g., Bluetooth or other wireless technology) by a computer device (e.g., a smartphone app) that can turn the LED device on and off, change the color of the LED light, and/or change the intensity of the LED light.

Particular Applications to Computer Devices

The candle device with the optional one or more LED lights applied to this invention may include a plurality of different computing device types. In general, a computing device type may be a computer system or computer server (e.g., a smartphone with an app). The computing device may be described in the general context of computer system executable instructions, such as program modules, being executed by a computer system (described for example, below). In some embodiments, the computing device may be a cloud computing node (for example, in the role of a computer server) connected to a cloud computing network (not shown). The computing device may be practiced in distributed cloud computing environments where tasks are performed by remote processing devices that are linked through a communications network. In a distributed cloud computing environment, program modules may be located in both local and remote computer system storage media including memory storage devices.

The computing device may typically include a variety of computer system readable media. Such media could be chosen from any available media that is accessible by the computing device, including non-transitory, volatile and non-volatile media, removable and non-removable media. The system memory could include random access memory (RAM) and/or a cache memory. A storage system can be provided for reading from and writing to a non-removable, non-volatile magnetic media device. The system memory may include at least one program product having a set (e.g., at least one) of program modules that are configured to carry out the functions of embodiments of the invention. The program product/utility, having a set (at least one) of program modules, may be stored in the system memory. The program modules generally carry out the functions and/or methodologies of embodiments of the invention as described herein.

Other Embodiments

Although the present invention has been described with reference to teaching, examples and preferred embodiments, one skilled in the art can easily ascertain its essential characteristics, and without departing from the spirit and scope thereof can make various changes and modifications of the invention to adapt it to various usages and conditions. Those skilled in the art will recognize or be able to ascertain using no more than routine experimentation, many equivalents to the specific embodiments of the invention described herein. Such equivalents are encompassed by the scope of the present invention.

What is claimed is:

1. A rechargeable container candle comprising a glass container, a top layer, a solid separation base layer, a plastic sheet, and a bottom solid permanent display layer, wherein:

(a) the glass container encloses the container candle;

(b) the top layer comprises a replaceable solid candle paraffin wax layer that was poured into the container and which contains one or more embedded candle wicks, which when replaced the paraffin wax is melted and poured into the glass container and the paraffin wax does not transfer into the bottom solid permanent display layer;

(c) the solid separation base layer is located underneath the top layer and fixed to the glass container, wherein the solid separation base layer serves as a preventive barrier to preserve and maintain the bottom solid permanent display layer;

(d) the plastic sheet is located underneath the solid separation base layer and above the bottom solid permanent display layer, wherein the plastic sheet prevents transfer of any color between the top layer and the bottom solid permanent display layer;

(e) the bottom solid permanent display layer comprises gel wax, one or more embedded display items, and an embedded display base; and (f) wherein the container candle is rechargeable by pouring in new candle paraffin wax and thus replacing the solid candle paraffin wax layer containing one or more embedded candle wicks without disturbing the bottom solid permanent display layer.

2. The rechargeable container candle of claim 1 wherein the one or more embedded display items are flowers and/or other plant materials.

3. The rechargeable container candle of claim 1 wherein the one or more embedded display items are figurines.

4. The rechargeable container of claim 1 wherein the one or more embedded display items form a landscape scene.

5. The rechargeable container candle of claim 1 wherein the one or more embedded display items form an ocean scene.

6. The rechargeable container candle of claim 1 wherein the one or more embedded display items form an outer space scene.

7. The rechargeable container candle of claim 1 further comprising a LED device contained in the bottom solid permanent display layer, the LED device being operationally accessible wirelessly.

8. The rechargeable container candle of claim 1 further comprising a second bottom solid permanent display layer.

9. The rechargeable container candle of claim 1 further comprising a second bottom solid permanent display layer and a third bottom solid permanent display layer.

* * * * *